United States Patent [19]

Chandaria

[11] Patent Number: 4,954,544

[45] Date of Patent: Sep. 4, 1990

[54] MODIFIED ADHESIVE COMPOSITION WHICH UNDERGOES COLOR CHANGES UPON APPLICATION

[75] Inventor: Ashok K. Chandaria, Ontario, Canada

[73] Assignee: Conros Corporation, Ontario, Canada

[21] Appl. No.: 319,112

[22] Filed: Mar. 3, 1989

[51] Int. Cl.$^5$ ................................................ C08K 5/15
[52] U.S. Cl. .................................... 524/111; 524/215; 524/548
[58] Field of Search ............... 524/107, 111, 215, 367, 524/548, 211; 156/64; 73/150 A; 427/9, 10

[56] References Cited

U.S. PATENT DOCUMENTS

| | | | |
|---|---|---|---|
| 2,658,045 | 11/1953 | Schildknecht | 260/29.6 |
| 2,878,216 | 3/1959 | Holmes et al. | 260/32.6 |
| 2,882,253 | 4/1959 | Lefferdink et al. | 260/29.6 |
| 3,197,350 | 7/1965 | Wedger et al. | 156/64 |
| 3,576,776 | 4/1971 | Muszik et al. | 260/22 |
| 3,661,899 | 5/1972 | Ford et al. | 260/240 |
| 4,070,510 | 1/1978 | Kahn | 427/385 |
| 4,071,645 | 1/1978 | Kahn | 427/340 |
| 4,297,160 | 10/1981 | Kusayama et al. | 156/64 |
| 4,325,863 | 4/1982 | Hinsken et al. | 524/111 |
| 4,722,962 | 2/1988 | Shay et al. | 524/548 |
| 4,743,238 | 5/1988 | Colon et al. | 524/271 |

OTHER PUBLICATIONS

Considine, D. M., *Chemical and Process Technology Encyclopedia*, McGraw-Hill, N.Y., 1974, p. 1075.

*Primary Examiner*—Joseph L. Schofer
*Assistant Examiner*—R. H. Delmendo
*Attorney, Agent, or Firm*—Burgess, Ryan & Wayne

[57] ABSTRACT

Adhesive compositions are provided containing additives which improve application characteristics and which undergo a color change upon application to a substrate. The adhesive composition is preferably in stick-form disposed in an applicator such as a reclosable tube dispenser.

11 Claims, No Drawings

MODIFIED ADHESIVE COMPOSITION WHICH UNDERGOES COLOR CHANGES UPON APPLICATION

FIELD OF THE INVENTION

This invention relates in general to an adhesive composition. In one aspect, this invention is directed to a colored adhesive composition which upon application to a surface, becomes colorless. In a further aspect, this invention relates to an adhesive composition in stick-form containing additives which provide improved application characteristics

BACKGROUND OF THE INVENTION

Stick-form rigid adhesives of the type which are often slidably mounted in a reclosable tube for dispensing and which deposit a tacky film when rubbed onto a receiving surface, have become part of everyday life. Such adhesives are typically obtained from a water-soluble or water-dispersible adhesive-forming synthetic high polymer, particularly polyvinylpyrrolidone (PVP), dissolved or dispersed in an aqueous-organic liquid phase together with a compatible gel-forming component. The gelled composition can be shaped, e.g., formed and handled in stick form, and, if desired, disposed in an applicator such as a reclosable tube dispenser. When rubbed onto a receiving surface, the micelle structure of the gelled adhesive is destroyed and the solidified composition is converted into an adhesive paste.

Numerous attempts have been made to improve adhesive sticks of this type by modifying the gel-forming component and/or by modifying the solvent-activated adhesive-forming component.

Despite all those proposals, the oldest form of adhesive sticks, i.e., those based on soap gels such as described in U.S. Pat. No. 3,576,776 to Muszik, et al., which issued Apr. 27, 1971, remain by far the most widely used. In a particular popular embodiment of this technology, a solution of PVP in an aqueous-organic solvent mixture is converted into a soft-rubbing adhesive stick by an incorporation of alkali soaps of aliphatic carboxylic acids as the gelling agent, followed by gelling of the mixture.

These adhesive sticks, however, suffer from several disadvantages. For example, the application of the adhesive to the substrate material from these sticks is often not as easy as is desirable, with the result that rubbing the adhesive stick onto fragile substrates such as thin paper cannot be readily accomplished. Further, the adhesive layer formed frequently has an inconveniently short open time as compared to similar commercial products, losing tackiness rapidly and hampering careful alignment of the surfaces to be bonded.

Additionally, the glue sticks currently being used are colorless, thus making it difficult for the users to identify the area to which the adhesive has been applied. While the incorporation of a color dye or pigment into such adhesive sticks will aid in identifying those areas coated, the presence of colors in the adhesive markedly limits their use since the color may remain visible, particularly, if white or light colored substrates are employed. It would therefore be highly desirable to have an adhesive which is colored and readily identifiable when applied to a substrate, but which becomes colorless after application and drying. It would also be desirable to have an adhesive composition in stick-form containing additives which improve application characteristics.

Accordingly, one or more of the following objects will be achieved by the practice of this invention. It is an object of this invention to provide colored adhesive composition which upon application to a substrate becomes colorless. Another object of this invention is to provide an adhesive composition in stick-form containing additives which provide improved application characteristics.

A further object of the invention is to provide an adhesive composition containing polyvinylpyrrolidone.

Another object is to provide an adhesive composition containing a gel-forming component.

A further object is to provide an adhesive composition in stick-form.

A still further object is to provide a colored adhesive in stick-form which is disposed in a reclosable tube dispenser.

Another object of the invention is to provide a colored adhesive in stick-form which contains a colored indicator additive.

These and other objects will readily become apparent to those skilled in the art in light of the teachings herein set forth.

SUMMARY OF THE INVENTION

In its broad aspect, the present invention is based on the discovery that soap gel based adhesives having certain additives incorporated therein, offer an improved adhesion and better vision because of special characteristics. This invention provides adhesives which are an improvement over the traditional glue stick and are characterized by a special indicator making the adhesive visible by color during application and becoming colorless upon drying by exposure to air. The additives have no adverse effect upon the mechanical stability of the adhesive stick material, but even improve the performance of the adhesive by giving it a smoother application characteristic.

While the adhesive composition of the invention is referred to throughout the specification as a "stick" characterizing the rigid shaped structure of a preferred embodiment, the invention is equally applicable to other adhesive compositions of varying firmness, which is usually controlled in the gelling step, as known in the prior art.

DETAILED DESCRIPTION OF THE INVENTION

Accordingly, this invention comprises a smoother rubbing adhesive stick composition with better adhesion and improved vision because of its special characteristic based on a soap gelled aqueous organic medium containing a film forming, water soluble or water dispensable synthetic adhesive forming polymer wherein the adhesive composition further contains one or more indicator additives as hereinafter defined.

As indicated above, the indicator additive employed in the preparation of the adhesive compositions of the present invention is a compound or chromophor which undergoes a color change from colored to colorless after the adhesive is applied to a substrate. A variety of chromophoric compounds can be employed, the only restriction being that they be compatible with the other components of the adhesive composition Illustrative indicators which can be employed in the adhesive compositions of this invention include, but are not limited to, compounds such as those represented by the formula:

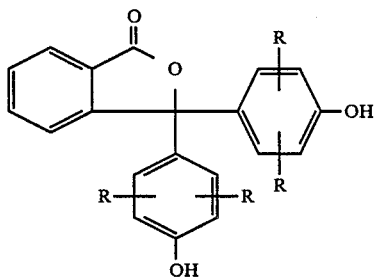

wherein each R can represent hydrogen or lower alkyl. Typical compounds encompassed by the above formula include
3,3-bis(4-hydroxyphenyl)-1-(3H)-isobenzofuranone,
3,3-bis[4-hydroxy-2-methyl-5-(1-methylethyl)phenyl]-1-(3H)isobenzofuranone,
3,3-bis(4-hydroxy-2-methylphenyl)-1-(3H)-isobenzofuranone,
3,3-bis(4-hydroxy-5-methylphenyl)-1-(3H)-isobenzofuranone,
3,3-bis(4-hydroxy-5-ethylphenyl)-1-(3H)-isobenzofuranone, and the like.

These indicators are commercially available such as phenolphthalein and its alkyl derivatives.

the adhesive compositions of the present invention also include a carbamide, such as urea, and a non-ionic surfactant, such as nonyl-phenol ethoyxlate. The carbamide and the non-ionic surfactant have HLB values between 10.5–16.

Suitable compositions of the present invention contain not more than about 5% by weight and preferably from about 0.01% to about 2% by weight of the indicator additive based on the adhesive composition as a whole. In the case of the carbamide, not more than about 6% by weight and preferably from about 0.1% to about 4.5% by weight based on the adhesive composition as a whole is needed. In case of the non-ionic surfactant, a quantity from about 0.001% to about 5% by weight again based on the total weight of the adhesive composition, and more preferably from about 0.01% to about 1%.

In practice, an adhesive stick composition can be prepared according to the present invention, by dispersing or dissolving the adhesive polymer in the organic medium together with the gelling agent, indicator additives, carbamide and non-ionic surfactants to form a homogeneous mixture. After heating to above about 80° C. to about 85° C., the resulting melt is molded into stick form. The melt viscosity of this formulation is considerably lower at the casting temperature usually from a[out 60° C. to about 65° C. than other known soap gel sticks. At 60° C. for example, a typical melt according to the present invention has a viscosity of less than about 14,000 cps while for known soap gels of the prior art, the melt is characterized by viscosities from about 90 to about 100,000 cps. The thinner the melt viscosity, the better it is to fill and obtain a bubble-free stick while simplifying the production techniques.

The modifying additives including the color indicator, carbamide and non-ionic surfactant give a special visible characteristic, improved flow and economy by reducing the amount of adhesive component employed without sacrificing bond strength. The following is a typical formulation which can be utilized in preparing the adhesive compositions of this invention:

| TYPICAL FORMULATION | |
| --- | --- |
| Sodium Myristate | 5.0% |
| Glycerol/Sorbitol | 12.0% |
| Polyvinylpyrrolidone | 30.0% |
| Indicator Additive | 1.0% |
| Carbamide/Non-Ionic Surfactant | 1.0% |
| Water | 51.0% |

The following examples are illustrative:

EXAMPLE 1

4.8 grams of myristic acid were introduced into an aqueous organic medium comprising 53 grams of water, 2 grams glycerol, 14 grams of 70% sorbitol. The system was equipped with heating, stirring and reflux condensations. 2.5 grams of 50% sodium hydroxide are then added with stirring followed by heating of the mix to 80°–90° C. After a clear solution had formed, 30 grams of polyvinylpyrrolidone (K-value 30-90) mixed with 2 grams of 3,3-bis (4-hydroxyphenyl)-1-(3H)-isobenzofuranone, 3.5 gms. of carbamide and non-ionic surfactant were scattered in while stirring and the temperature was increased to 90° C. After the polyvinylpyrrolidone had completely dissolved, the mass was cast at about 60° C into standard sticks. Dimensionally stable sticks were obtained after cooling to room temperature.

In a similar manner, the experiments are repeated using 3,3-bis[4-hydroxy-2-methyl-5-(1-methyl)phenyl]-1-(3H)-isobenzofuranone as the indicator.

Testing:

Testing was carried out at room temperature (23.5° C) in 35 to 37% relative air humidity. Ponding was tested on specified test paper (Chrome paper 100 gr/m$^2$) coated on one side which has already been stored at standard conditions. Apply 2" wide and 4–6" long glue line under normal hand pressure to the uncoated side of the specified paper. The glue shows a purple color line on the paper. The stick was drawn over the paper 3–4 times under normal hand pressure. Before the adhesive-coated side of the test paper was pressed onto a substrate of the same paper, the adhesive coated paper was left open for 30–60 seconds under the above described conditions. A colorless tearbond results in less than 15 minutes.

Although the invention has been illustrated by the foregoing description, it is not to be construed as being limited to the materials employed therein, but rather, the invention relates to the broad areas as hereinbefore disclosed. Various modifications and embodiments thereof can be made without departing from the spirit or scope thereof.

What is claimed is:

1. An adhesive composition, which upon application to a substrate, undergoes a change from colored to colorless, said composition comprised of:
  (a) polyvinylpyrrolidone in an aqueous organic medium with a soap forming gelling agent,
  (b) a colored indicator additive which upon exposure to air becomes colorless, and which has the formula:

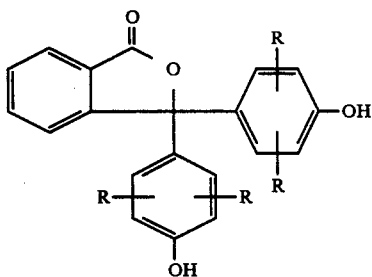

wherein each R individually represents hydrogen or lower alkyl,
(c) a carbamide, and
(d) a non-ionic surfactant.

2. The adhesive composition of claim 1 wherein said indicator is present in an amount of about 0.01 to 5% by weight based on the total weight of said composition.

3. The adhesive composition of claim 2 wherein said carbamide and non-ionic surfactant are present in an amount of about 0.01 to 10% by weight based on the total weight of said composition.

4. The adhesive composition of claim 1 wherein said indicator additive is 3,3-bis(4-hydroxyphenyl)-1-(3H)-isobenzofuranone.

5. The adhesive composition of claim 1 wherein said indicator additive is 3,3-bis[4-hydroxy-2-methyl-5-(1-methylethyl)phenyl]-1-(3H)-isobenzofuranone.

6. The adhesive composition of claim 1 which is in stick form.

7. The adhesive composition of claim 6 which is contained within a reclosable tube dispenser.

8. The adhesive composition of claim 7 wherein said indicator additive is a 3,3-bis(p-hydroxyphenyl)-1-(3H)-isobenzofuranone 9. The adhesive composition of claim 8 wherein said indicator additive is present in an amount of from about 0.01 to about 2 percent by weight of said composition.

10. The adhesive composition of claim 7 wherein said indicator additive is 3,3-bis[4-hydroxy-2-methyl-5-(1-methylethyl)phenyl]-1-(3H)-isobenzofuranone.

11. The adhesive composition of claim 10 wherein said indicator additive is present in an amount of from about 0.01 to about 2 percent by weight of said composition.